United States Patent
Kimura et al.

[11] Patent Number: 5,351,443
[45] Date of Patent: Oct. 4, 1994

[54] AUTOMOTIVE DOOR WITH WINDOW PANE LIFTER MODULE

[75] Inventors: Koichi Kimura; Hiroshi Tsuchiya; Kenichi Hirooka; Hiromitsu Nishikawa, all of Kanagawa, Japan

[73] Assignees: Nissan Motor Co., Ltd.; Ohi Seisakusho Co. Ltd., both of Japan

[21] Appl. No.: 996,828

[22] Filed: Dec. 28, 1992

[30] Foreign Application Priority Data

| Dec. 28, 1991 | [JP] | Japan | 3-359739 |
| Dec. 28, 1991 | [JP] | Japan | 3-359740 |
| Dec. 28, 1991 | [JP] | Japan | 3-359741 |
| Dec. 28, 1991 | [JP] | Japan | 3-359742 |

[51] Int. Cl.$^5$ ............................................. B60J 5/04
[52] U.S. Cl. ................................. 49/502; 296/146.2
[58] Field of Search .......... 49/502; 296/146 R, 146 B, 296/146 J, 146 K, 146.6, 146.7

[56] References Cited

U.S. PATENT DOCUMENTS

| 4,648,208 | 3/1987 | Baldamus et al. | |
| 4,662,115 | 5/1987 | Ohya et al. | |
| 4,794,735 | 1/1989 | Batchelder et al. | |
| 4,831,710 | 5/1989 | Katoh et al. | 49/502 X |
| 4,924,630 | 5/1990 | Lomasney et al. | 296/146 K X |
| 4,984,389 | 1/1991 | Benoit et al. | 296/146 K X |
| 4,986,029 | 1/1991 | Richter | 49/351 X |
| 4,991,351 | 2/1991 | Bertolini | 49/351 |
| 5,033,236 | 7/1991 | Szerdahelyi et al. | 49/502 |
| 5,090,158 | 2/1992 | Bertolini | 49/502 X |
| 5,095,659 | 3/1992 | Benoit et al. | 49/502 |
| 5,169,204 | 12/1992 | Kelman | 49/502 |
| 5,226,259 | 7/1993 | Yamagata et al. | 49/502 |

FOREIGN PATENT DOCUMENTS

| 0405159A1 | 5/1990 | European Pat. Off. | |
| 4197829 | 7/1992 | Japan | 296/146 R |
| 4197831 | 7/1992 | Japan | 296/146 R |
| 2222847A | 3/1990 | United Kingdom | |
| 2250534 A | 6/1992 | United Kingdom | |

*Primary Examiner*—Peter M. Cuomo
*Assistant Examiner*—Jerry Redman
*Attorney, Agent, or Firm*—Lowe, Price, LeBlanc & Becker

[57] ABSTRACT

An automotive door comprises generally an outer module; an inner module and a window pane lifter module interposed between the outer and inner modules. The window pane lifter module includes a door inner waist reinforce member which is fixed to an inner panel of the outer module and a window pane regulator which is connected to the door inner waist reinforce member and regulates the window pane. The door inner waist reinforce member, the window pane regulator and the window pane are integrally assembled to constitute a unit.

21 Claims, 13 Drawing Sheets

AUTOMOTIVE DOOR WITH WINDOW PANE LIFTER MODULE

BACKGROUND OF THE INVENTION

1. Field of the Invention

The present invention relates in general automotive doors, and more particularly, to automotive doors of a type which is equipped with a window pane lifter mechanism.

2. Description of the Prior art

In automotive doors, there is usually installed a window pane lifter mechanism. One of the doors of such type is shown in VOLUME-578 of SERVICE MANUAL (Page B-30) issued from NISSAN MOTOR CO., LTD. June, 1987.

The window pane lifter mechanism of this door comprises guide rails connected through bolts to an inner panel of the door, guide rollers slidably engaged with the guide rails and carrying thereon a window pane, and a power device secured through bolts to the inner panel to drive the window panel upward and downward along the guide rails. After the door is assembled, inspection and adjustment of the window pane lifter mechanism are carried out.

However, such inspection and adjustment are troublesome. In fact, the adjustment of the lifter mechanism has been carried out by loosening the bolts, moving the parts to right positions and refastening the bolts, using the outer panel of the door as a position reference member. In fact, numerous bolts are employed for tightly connecting the window pane lifter mechanism to the door proper.

Furthermore, since the adjustment of the window pane lifter mechanism has been carried out with respect to only the position of the outer panel, the positional relationship between the window pane and the inner panel and that between the window pane and an interior member of the door have not been assured.

SUMMARY OF THE INVENTION

It is therefore an object of the present invention to provide an automotive door of a type having a window pane lifter mechanism, which is free of the above-mentioned drawbacks.

According to the present invention, there is provided an automotive door having therein a window pane lifter module, the module being constructed by integrally connecting a door inner waist reinforce member, a window pane regulator and a window pane. In this door, inspection and adjustment of the door lifting mechanism can be made with ease prior to completion of assembly of the door.

According to the present invention, there is provided an automotive door having therein a window pane lifter module in which two types of window pane inclination angle adjusting means are arranged by which the inclination angle of the window pane relative to the door proper can be adjusted with ease.

According to the present invention, there is provided an automotive door having therein a window pane lifter module in which a ball-joint connection is established between the window pane and the guide rails in order to smooth the inclining movement of the window pane.

According to the present invention, there is provided an automotive door having a window pane. The door comprises an outer module including an outer panel and an inner panel which are connected to each other; an inner module; and a window pane lifter module interposed between the outer and inner modules, the window pane lifter module including a door inner waist reinforce member which is fixed to the inner panel of the outer module and a window pane regulator which is connected to the door inner waist reinforce member and regulates the window pane, wherein the door inner waist reinforce member, the window pane regulator and the window pane are integrally assembled to constitute a unit.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

In the following, the automotive door of the invention will be described in detail with reference to the accompanying drawings. In the description, the terms "front", "rear", "right", "left" and the like are to be understood with respect to a motor vehicle to which the door is connected.

Figure 1:
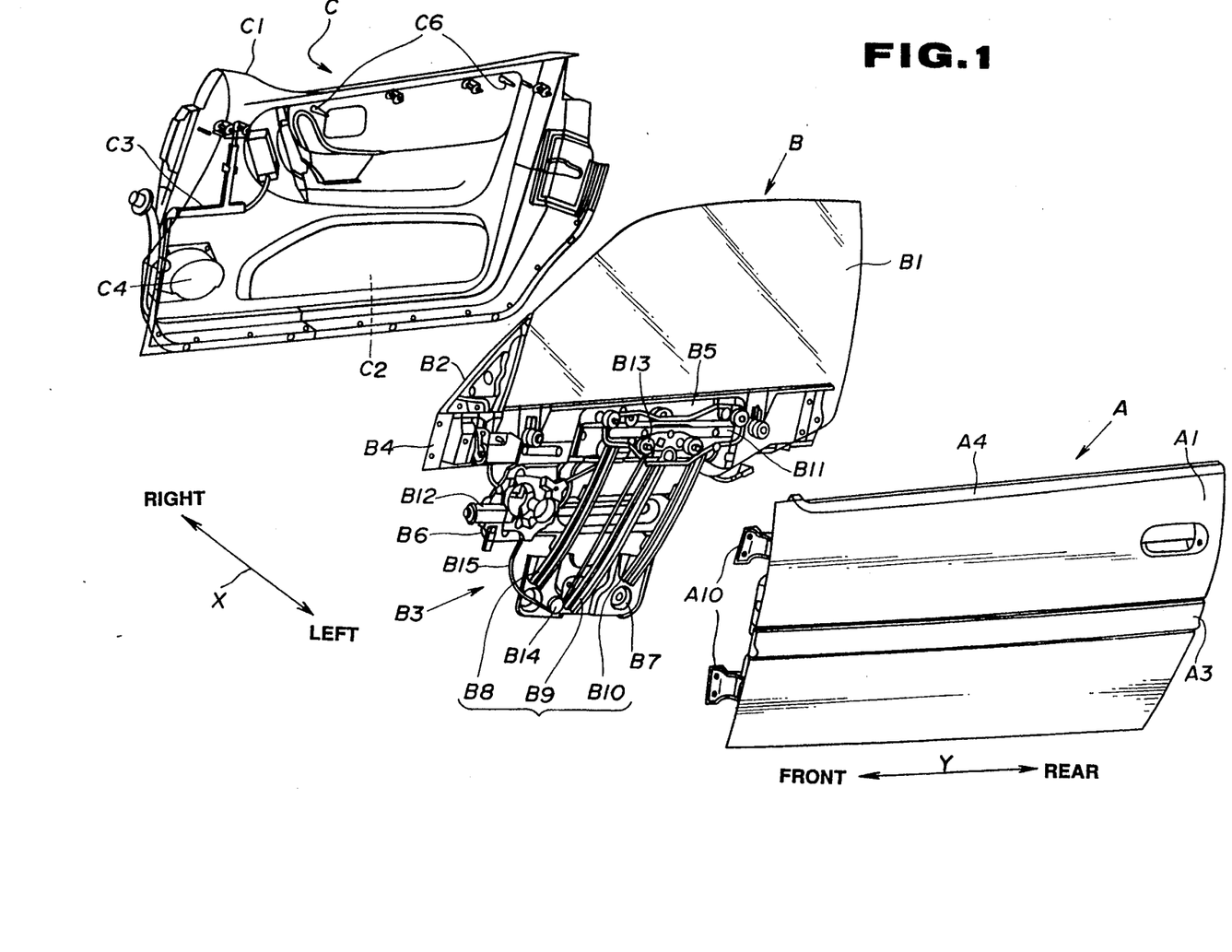
FIG. 1 is an exploded view of an automotive door with a window pane lifter mechanism, according to the present invention.

Referring to FIGS. 1 to 14, particularly FIG. 1, there is shown an automotive left side door according to the present invention. In the drawings, the arrows denoted by references "X" and "Y" indicate the lateral and fore-and-aft directions of the vehicle, respectively.

FIG. 1, shows the entire automotive door. As shown, the door comprises generally three modules, which are an outer module "A", a window pane lifter module "B" and an inner module "C".

Figure 5:
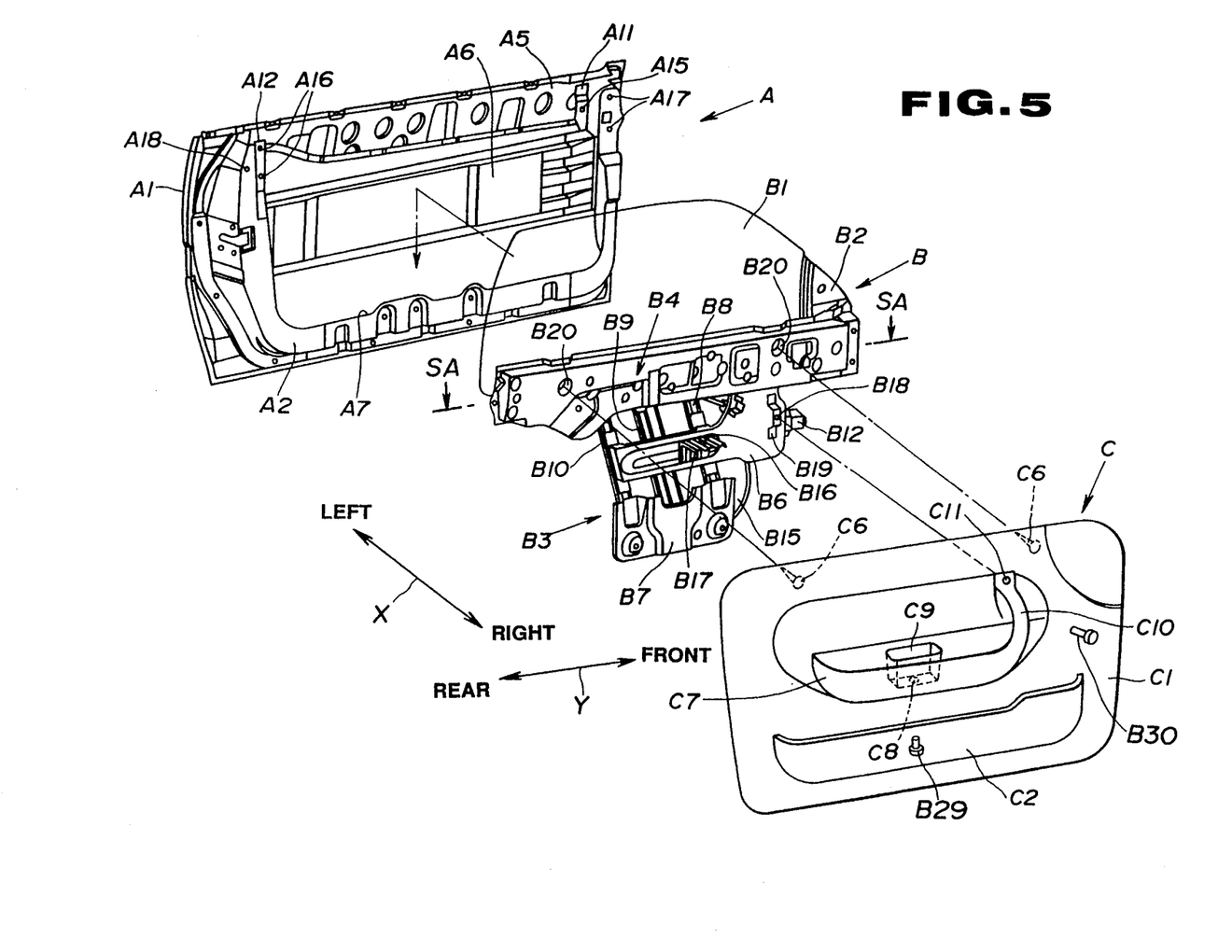
FIG. 5 is an exploded view of the automotive door taken from the inside of an associated motor vehicle.

As is seen from FIGS. 1 and 5, the outer module "A" comprises generally an outer panel A1 and an inner panel A2 which are connected to each other. As is seen from FIG. 1, upper and lower moldings A4 and A3 are attached to an outer surface of the outer panel A1. As is seen from FIG. 5, a reinforcing member A5 and a guard member A6 are attached to an inner surface of the outer panel A1.

Figure 6:
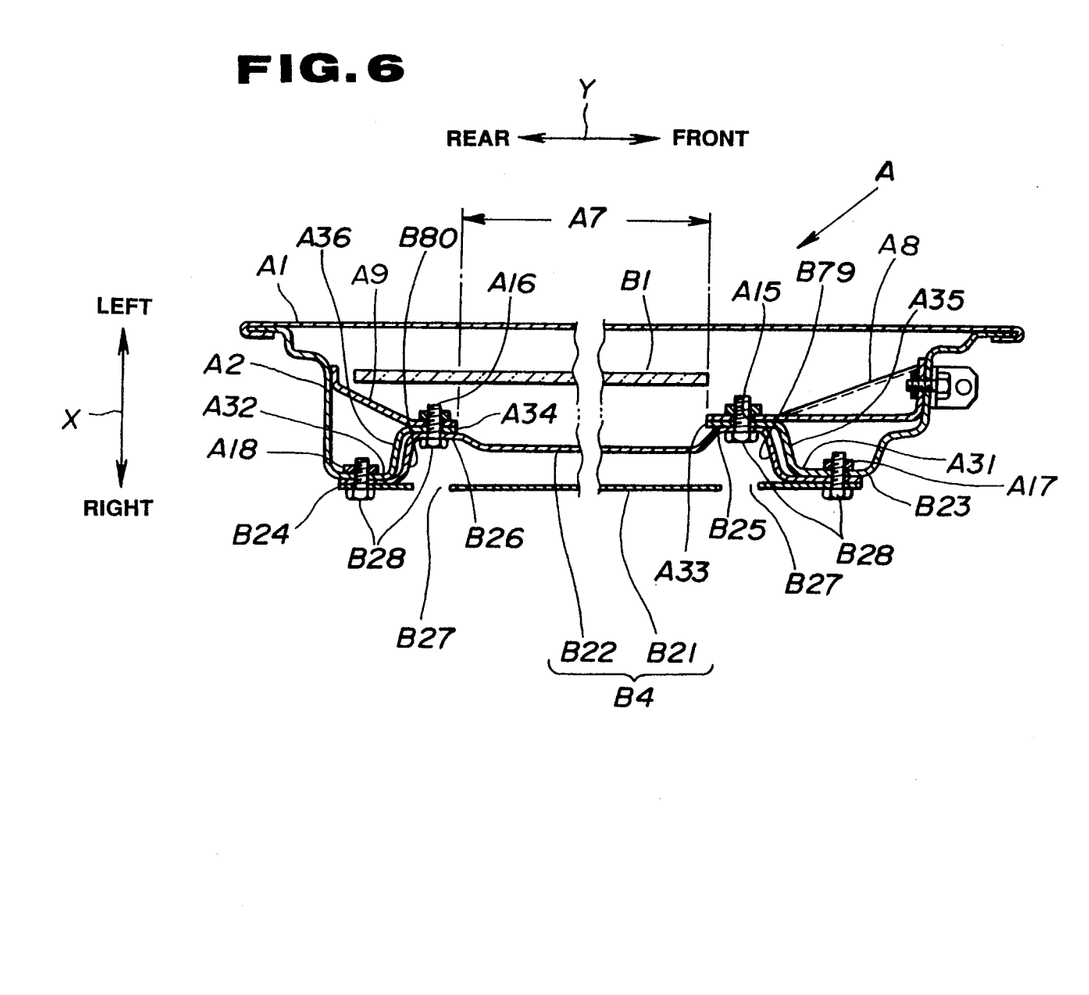
FIG. 6 a partially omitted sectional view taken long the line "SA—SA" of FIG. 5.

As is seen from FIG. 5, the inner panel A2 is formed with a large rectangular aperture A7, so that a large rectangular depression or pocket is defined on the inner side of the outer module "A". The inner panel A2 has at its front upper and rear upper ends stepped portions A11 and A12 which, as will be seen from FIG. 6, are tightly supported by respective brackets A13 and A14 installed in the outer module "A". The front stepped portion A11 is formed with one bolt opening A15 and the rear stepped portion A12 is formed with two bolt openings A16. Furthermore, near the front stepped portion A11 and the rear stepped portion A12, the inner panel A2 has two bolt openings A17 and one bolt opening A18, respectively.

It is to be noted that all of the bolt openings A15, A16, A17 and A18 of the inner panel A2 face in the same direction, that is, toward the window pane lifter module "B".

As is seen from FIG. 1, the outer module "A" has at its front end two hinges A10 secured thereto.

The window pane lifter module "B" comprises generally a window pane B1, a corner piece B2, a regulator B3 and a door inner waist reinforce member B4.

Figure 3:
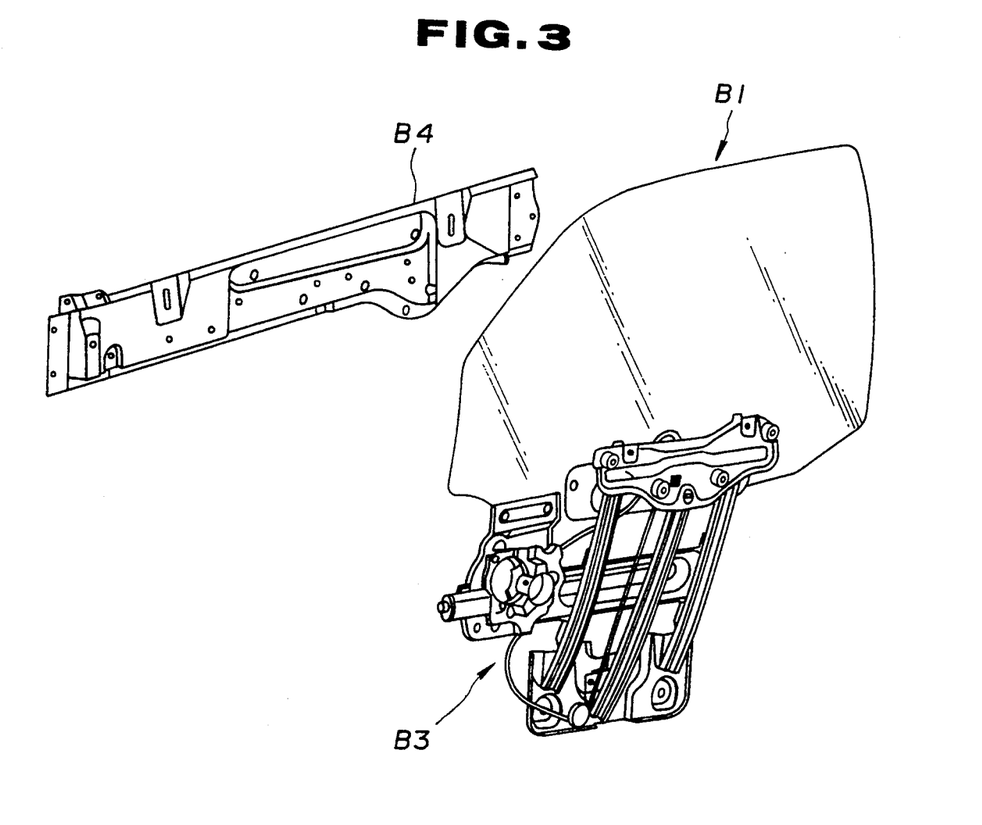
FIG. 3 is a perspective view showing the regulator having the window pane mounted thereto, and a door inner waist reinforce member.
Figure 4:
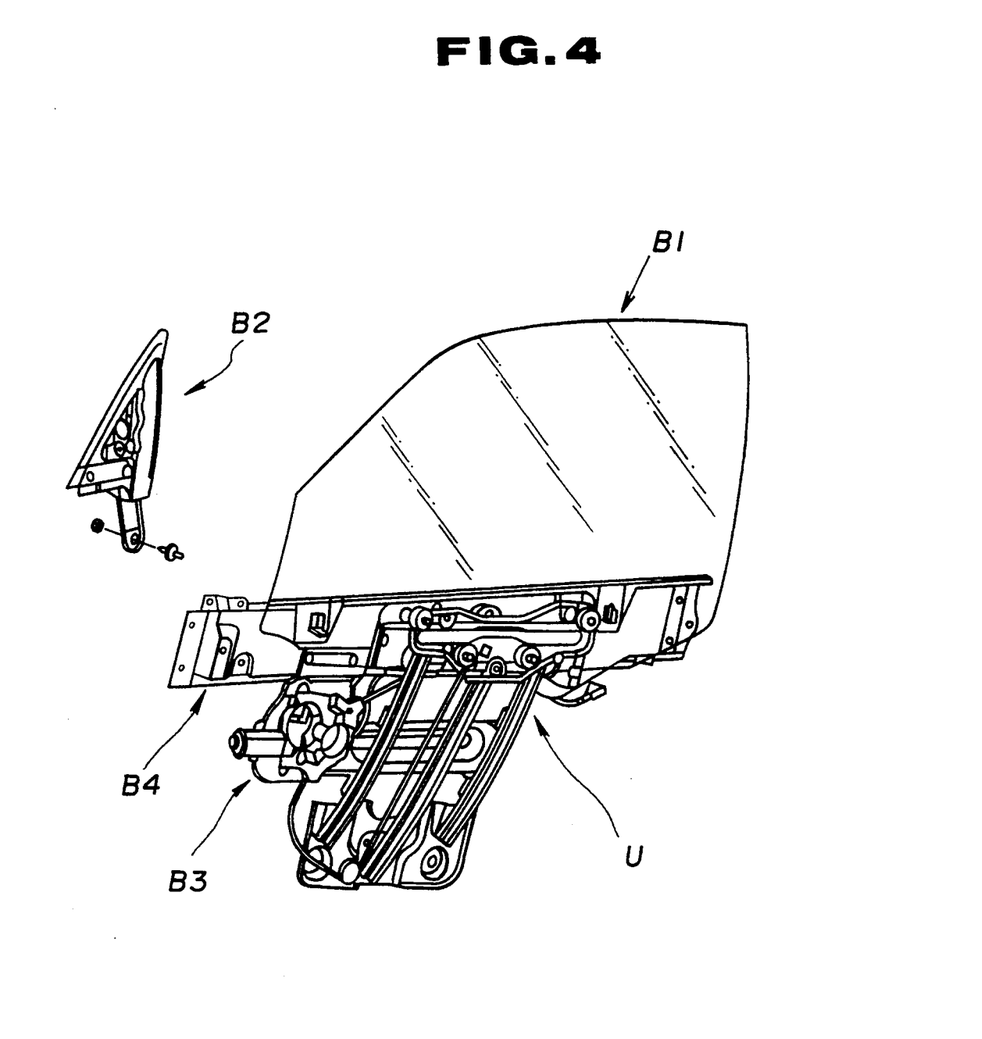
FIG. 4 is a perspective view showing the regulator having the window pane and the door inner waist reinforce member mounted thereto, and a corner piece.

As is seen from FIG. 3, the regulator B3 comprises front, center and rear guide rails B8, B9 and B10 of metal, which are supported by a supporting structure which comprises upper, waist and lower brackets B5, B6 and B7. Thus, the front, center and rear guide rails B8, B9 and B10 and the upper, waist and lower brackets B5, B6 and B7 constitute a robust structure. It is however to be noted that the waist bracket B6 is not secured to the center guide rail B9.

An upper projected portion of the waist bracket B6 is connected to the inner waist reinforce member B4, as is seen from FIG. 1. For the reason which will be described hereinafter, the upper bracket B5 has two positioning openings B45 at opposed end portions (see FIG. 14). As shown in FIG. 3, each guide rail B8, B9 or B10 extends obliquely upward, while each bracket B5, B6 or B7 extends horizontally. A carrier plate B11 is movably supported by the three guide rails B8, B9 and B10 through front, center and rear guide roller units B48, B49 and B50. That is, the carrier plate B11 can take a complex path for the upward and downward movement along the guide rails B8, B9 and B10. The front, center and rear guide roller units B48, B49 and B50 are respectively associated with the front, center and rear guide rails B8, B9 and B10, as is seen from FIG. 8.

Figure 8:
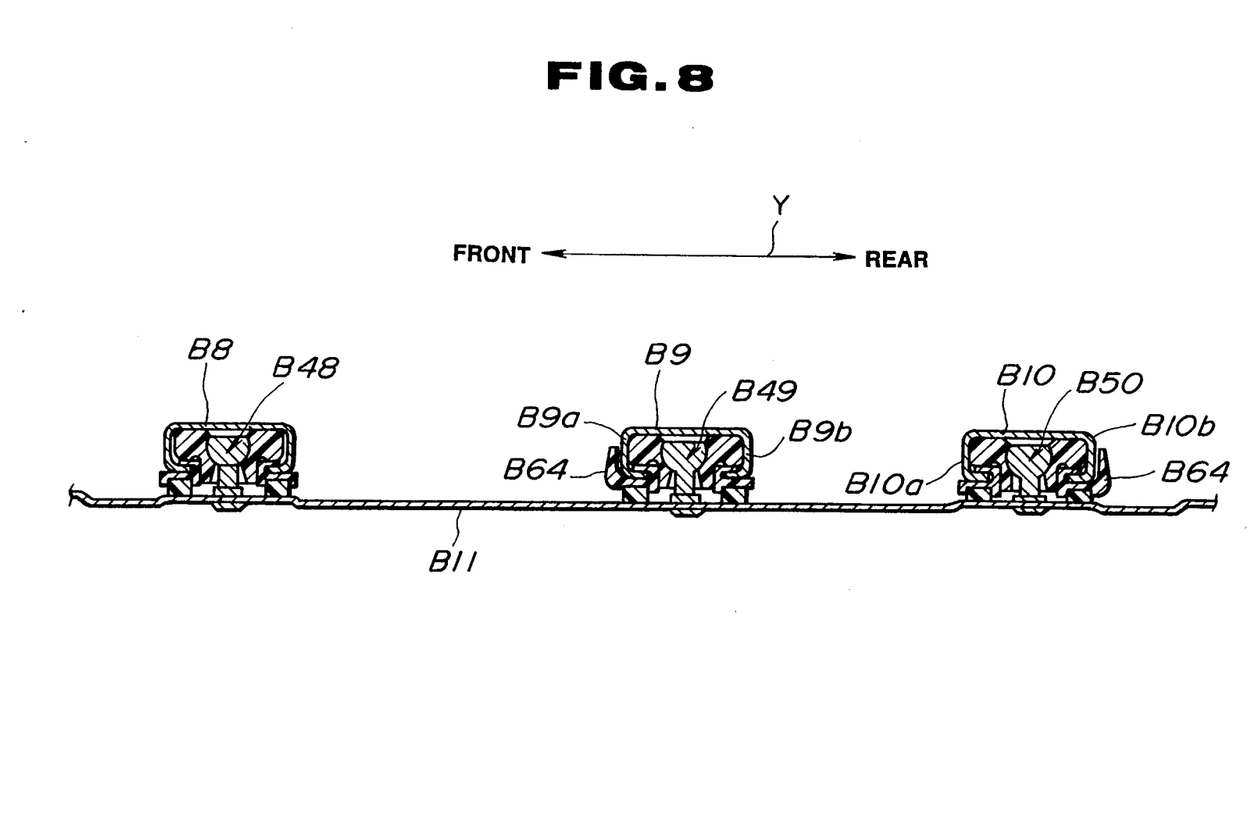
FIG. 8 is an enlarged sectional view taken along the line "SC—SC" of FIG. 7.
Figure 9:
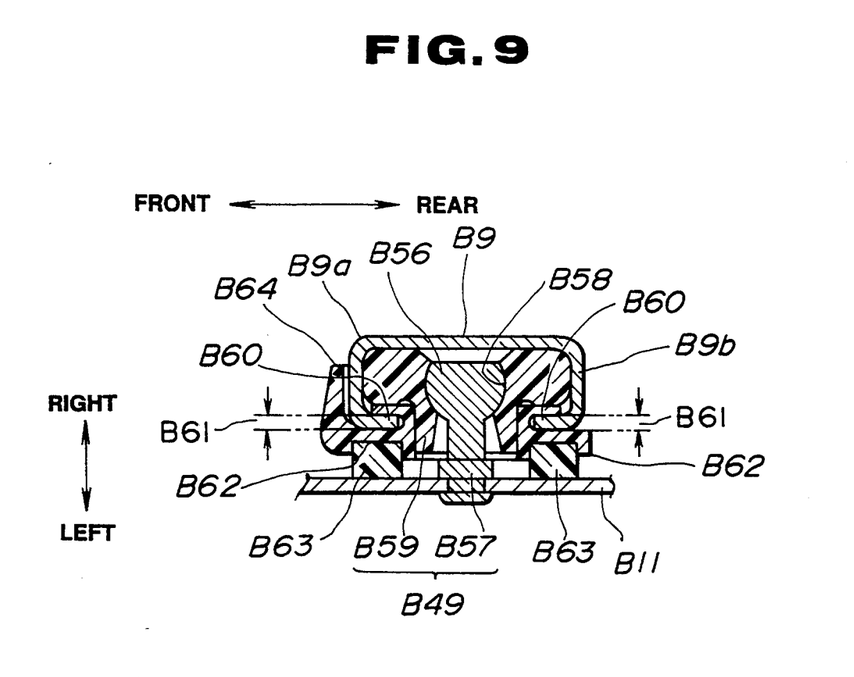
FIG. 9 is a sectional view of a part of the regulator, showing a center guide rail and a guide roller unit engaged therewith.

As is seen from FIGS. 8 and 9, each guide rail B8, B9 or B10 has a channel-like construction including a base flat wall (no numeral), opposed side walls B9a and B9b (or, B10a and B10b) and mutually directed lip portions B60.

Since the three guide roller units B48, B49 and B50 have substantially the same construction except aftermentioned small points, only the center guide roller unit B49 will be described in detail with reference to FIG. 9.

As is seen from FIG. 9, the guide roller unit B49 comprises a metal shaft B57 fixed to the carrier plate B11. The metal shaft B57 has a spherical head portion B56 about which a plastic roller B59 is rotatably disposed. For the rotatable connection, the roller B59 has a spherical inner surface B58. That is, a so-called "ball-joint connection" is established between the metal shaft B57 and the plastic roller B59. The roller B59 is rotatably and slidably disposed in the guide rail B9. The roller B59 has a smaller diameter portion (no numeral) slidably held by a generally rectangular plastic slider B62 which is slidably engaged with the mutually directed lip portions B60 of the guide rail B9. The plastic slider B62 is mounted on an annular elastic member B63 which is secured to the carrier plate B11. For achieving the slidable engagement to the lip portions B60, the plastic slider B62 is formed with a pair of grooves B61 each slidably receiving the lip portion B60, as shown. Thus, the carrier plate B11, the annular elastic member B63, the slider B62, the roller B59 and the shaft B56 constitute a single unit which moves relative to the guide rail B9.

Because the front, center and rear guide roller units B48, B49 and B50 have the abovementioned construction, a lateral play (viz., the play in the direction of "X" of FIG. 9) of the carrier plate B11 relative to the guide rails B8, B9 and B10 is strictly limited.

In addition to the above-mentioned construction, the center and rear guide roller units B49 and B50 have additional means which limits a fore-and-aft play of the carrier plate B11. That is, as is seen from FIGS. 8 and 9, the center guide roller unit B49 is provided with a front stopper B64 which extends from the slider B62. The stopper B64 extends near and along the front side wall B9a of the center guide rail B9. While, as is seen from FIG. 8, the rear guide roller unit B50 is provided with a rear stopper B64 which extends near and along the rear side wall B10b of the rear guide rail B10. With these stoppers B64, the fore-and-aft play of the carrier plate B11 relative to the guide rails B8, B9 and B10 is strictly limited.

As shown in FIG. 3, the window pane B1 has a lower end secured to the carrier plate B11, so that the window pane B1 and the carrier plate B11 are moved together like a single unit. As is best seen from FIG. 2, at a front portion of the waist bracket B6, there is mounted a power device B12 which comprises a reversible electric motor and a speed reduction gear. From the power device B12, more specifically, from the speed reduction gear of the device B12, there extends a drive wire B15 which is put around upper and lower pulleys B13 and B14. The upper pulley B13 is rotatably connected to the upper bracket B5 and the lower pulley B14 is rotatably connected to the lower bracket B7. A portion of the drive wire B15 is fixed to the carrier plate B11. Thus, upon energization of the electric motor, the drive wire B15 is driven in either direction to move the carrier plate B11 upward or downward along the guide rails B8, B9 and B10.

As is seen from FIG. 5, a generally L-shaped bracket B17 is secured to an inner surface of the waist bracket B6. The bracket B17 is formed at its middle portion with a bolt opening B16. A small bracket B19 is fixed to a front portion of the waist bracket B17, which is formed with a bolt opening B18. The inner waist reinforce member B4 is formed at its inner surface with front and rear locating openings B20. These locating openings B20 face in the same direction, that is, toward the inner module "C".

As will be seen from FIG. 6, the inner waist reinforce member B4 has a hollow construction including a first plate member B21 and a second plate member B22 which are assembled together to have a space therebetween. Upon assembly of the door, the first plate member B21 faces the inner module "C" and the second plate member B22 faces the outer module "A". The reinforce member B4 has at its front portion two bolt openings B24 which are to be mated with the bolt openings A17 of the aforementioned inner panel A2 of the outer module "A", and at its rear portion one bolt opening B24 which is to be mated with the bolt opening A18 of the inner panel A2. The second plate member B22 is formed at its front portion with a bolt opening B25 which is to be mated with the bolt opening A15 of the inner panel A2, and at its rear portion with two bolt openings B26 which are to be mated with the bolt openings A16 of the inner panel A2. The first plate member B21 is formed with service apertures B27 at portions which face the bolt openings B25 and B26 of the second plate member B22.

Figure 7:
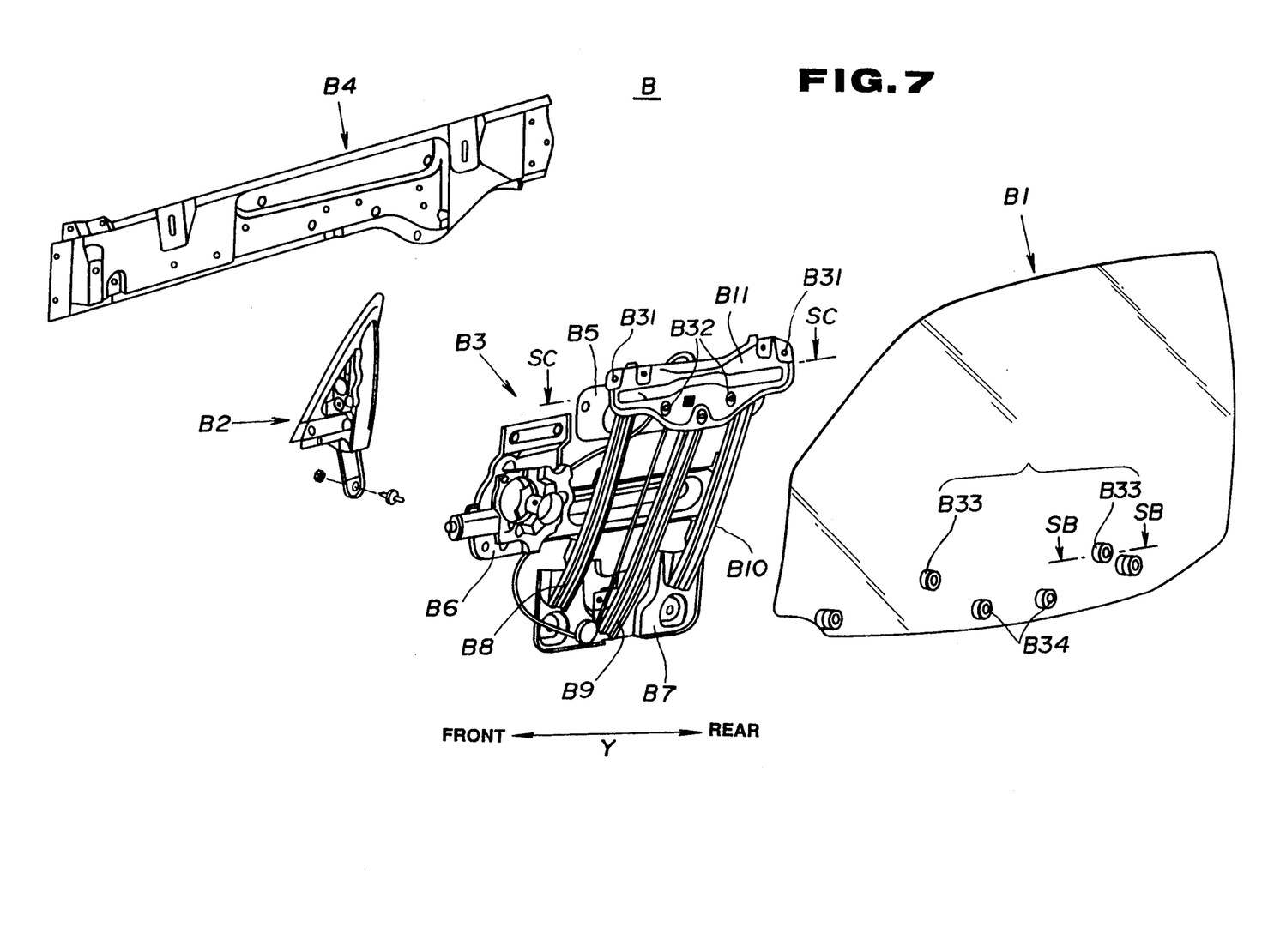
FIG. 7 is a perspective view showing the regulator, the window pane, the door inner waist reinforce member and the corner piece.

As is seen from FIG. 7, the carrier plate B11 is formed with a pair of upper bolt openings B31 and a pair of lower bolt openings B32. As is seen from FIG. 10, each of the bolt openings B31 and B32 is equipped with a lock nut B40.

Referring back to FIG. 7, the window pane B1 is formed at its lower portion with a pair of upper bolt openings B33 and a pair of lower bolt openings B34. As is seen from FIG. 10, each of the bolt openings B33 and B34 of the window pane B1 has a ring nut B35 bonded thereto. Engaged with the ring nut B35 is an adjusting bolt B39 which has a lock nut B37 and a washer B36 disposed thereabout. The adjusting bolt B39 has at its leading end portion a ring flange B38 secured thereto.

In the following, steps for assembling the window pane lifter module "B" will be described with reference to FIGS. 1 to 4.

Figure 2:
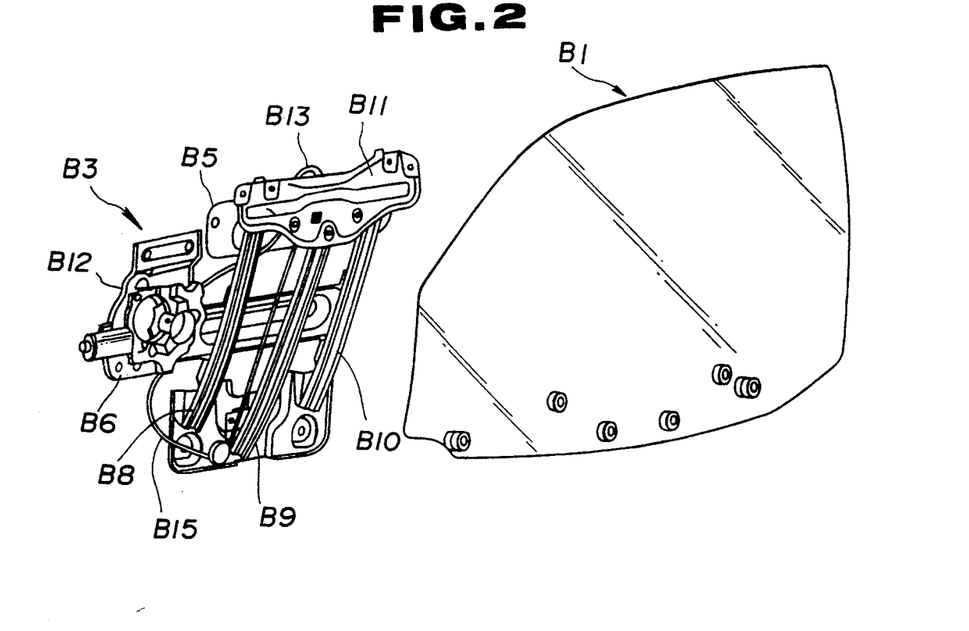
FIG. 2 is a perspective view showing a window pane regulator and a window pane.

First, as is seen from FIG. 2, by using a setting tool which will be described in detail hereinafter, the window pane B1 and the regulator B3 are positioned to each other, and the window pane B1 is secured to the carrier plate B11 of the regulator B3 by means of the adjusting bolts B39. That is, as is seen from FIG. 10, each adjusting bolt B39 is screwed into the lock nut B40 of the carrier plate B11 to such a position that the ring flange B38 abuts against the carrier plate B11. It is thus to be noted that by turning the adjusting bolts B39 by equal turns, the distance "L1" between the window pane B1 and the carrier plate B11 is varied. Furthermore, by turning the adjusting bolts B39 by different degrees, the inclination angle (viz., the angle defined with respect to the lateral direction "X") of the window pane B1 relative to the carrier plate B11 can be varied or adjusted.

Then, as is seen from FIG. 3, the upper bracket B5 of the regulator B is secured by bolts to the inner waist reinforce member B4. With this, the window pane B1, the regulator B3 and the inner waist reinforce member B4 are assembled to constitute a unit structure "U" as is seen from FIG. 4. Then, the corner piece B2 is brought to a front edge of the window pane B1 and secured to the reinforce member B4 by means of bolts. With these steps, the window pane lifter module "B" is assembled (see FIG. 1).

In the following, the steps for securing the window pane B1 to the carrier plate B11 will be described in much detail with reference to FIGS. 7, 10 and 14.

Figure 14:
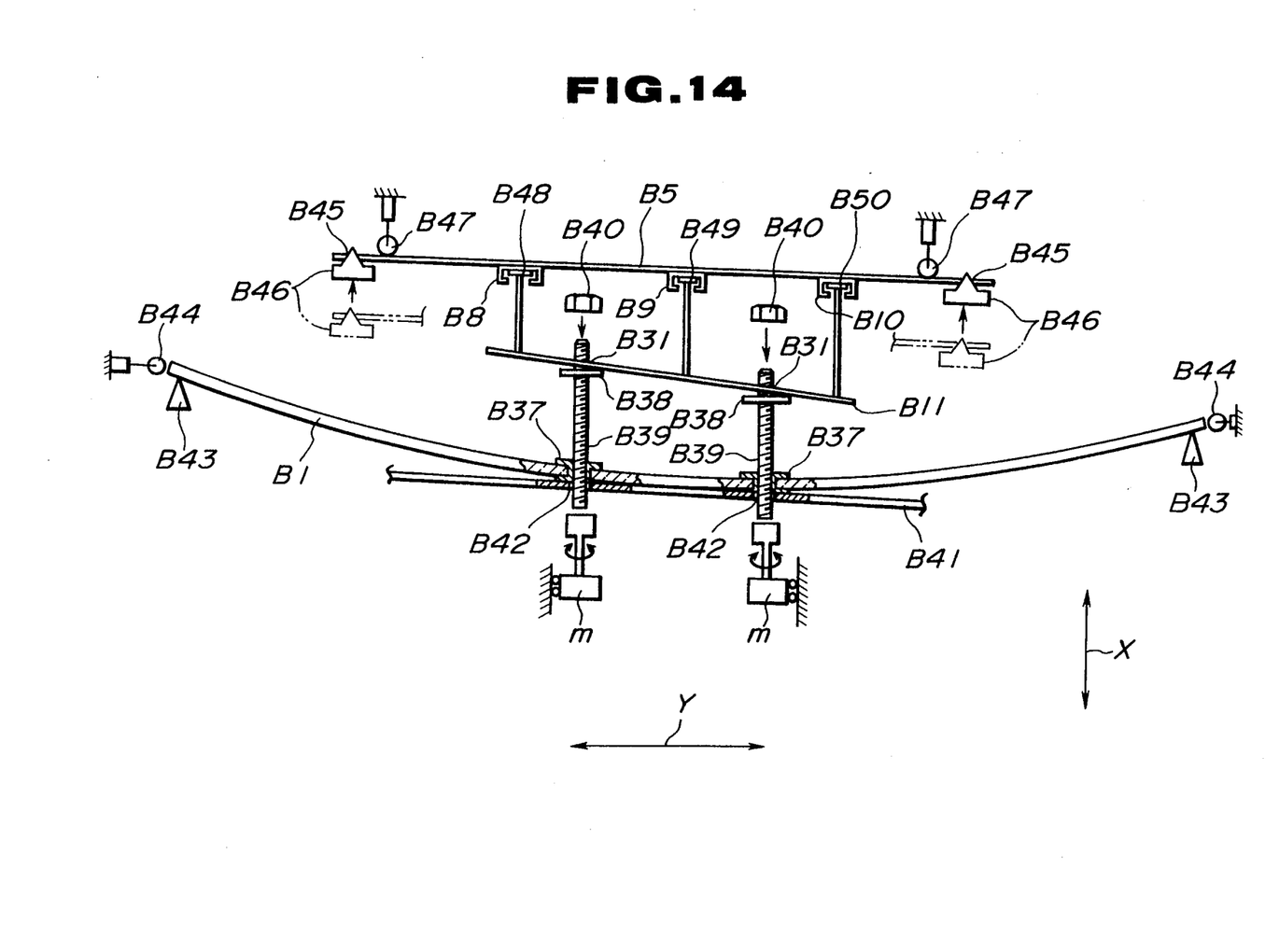
FIG. 14 is an illustration showing the procedure for connecting the window pane to the carrier plate by using a setting tool.

First, the window pane B1 having the ring nuts B35 fitted to the bolt openings B33 is put on a setting tool B41 in such a manner as shown in FIG. 14. That is, base portions of the adjusting bolts B39 which have been engaged with the ring nuts B35 are put in positioning openings B42 of the setting tool B41 and front and rear end portions of the window pane B1 are put on first holders B43. Due to the engagement between the adjusting bolts B39 and the positioning openings B42, the positioning of the window pane B1 in both the vertical direction and the fore-and-aft direction "Y" is assured, and due to the engagement between the front and rear end portions of the window pane B1 and the first holders B43, the positioning of the front and rear end portions of the window pane B1 relative to the setting tool B41 is assured. However, if there is an ill-positioning of the window pane B1 in the direction "Y", a first position sensor B44 detects such ill-positioning. In this case, the window pane B1 is moved slightly in the direction "Y" to the right position.

Then, the regulator B3 is put on the setting tool B41 in such a manner that the positioning openings B45 of the upper bracket B5 receive respective projections of second holders B46, as shown. With this, the positioning of the regulator B3 in both the vertical direction and the fore-and-aft direction "Y" is assured. Then, the second holders B46 are moved away from the window pane B1 together with the regulator B3 and stopped when the same actuate a second position sensor B47. With this, the positioning of the regulator B3 in the direction "X" is assured.

Then, the window pane B1 and the regulator B3, which have been thus positioned, are assembled in the following manner.

The adjusting bolts B39 are turned by motors "m". When, after the leading ends of the adjusting bolts B39 are inserted into the bolt openings B31 of the carrier plate B11, the ring flanges B38 on the adjusting bolts B39 abut against the carrier plate B11, the motors "m" are stopped. The abutment of the ring flanges B38 to the carrier plate B11 can be detected by monitoring the load applied to the first holder B43 or the second holder B46. Furthermore, such abutment can be detected by monitoring the torque produced by the motors "m". Then, the lock nuts B40 are engaged with the leading ends of the adjusting bolts B39 thereby to fix the adjusting bolts B39 to the carrier plate B11. After this, the window pane B1 is dismantled from the setting tool B41, and then the other lock nuts B37 (see FIG. 10) are engaged with the base ends of the adjusting bolts B39 to tightly secure the bolts B39 to the window pane B1. With these steps, the window pane B1 and the carrier plate B11 are assembled.

Figure 10:
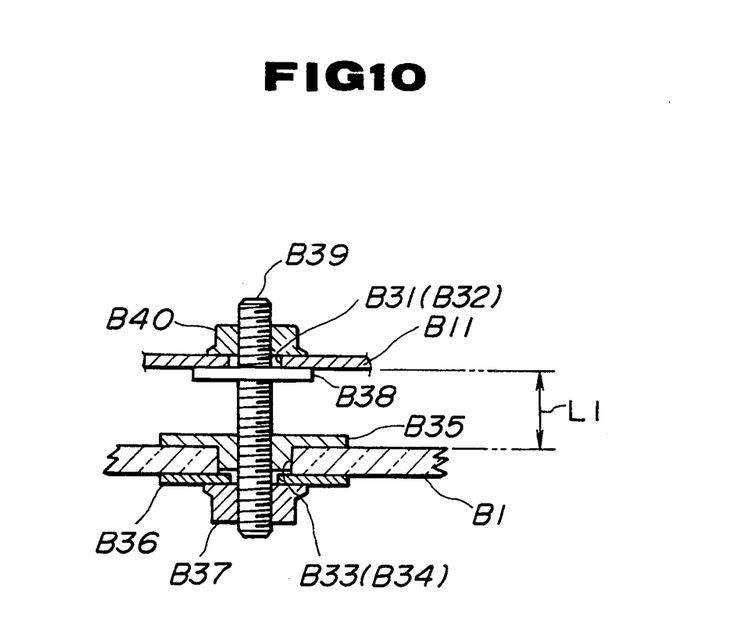
FIG. 10 is an enlarged sectional view taken along the line "SB—SB" of FIG. 7.

As is understood from FIGS. 7 and 10, since the window pane B1 is connected to the carrier plate B11 through the upper and lower groups of adjusting bolts B39, the inclination angle of the window pane B1 relative to the carrier plate B11 can be varied by turning the four adjusting bolts B39 by different degrees.

Figure 11:
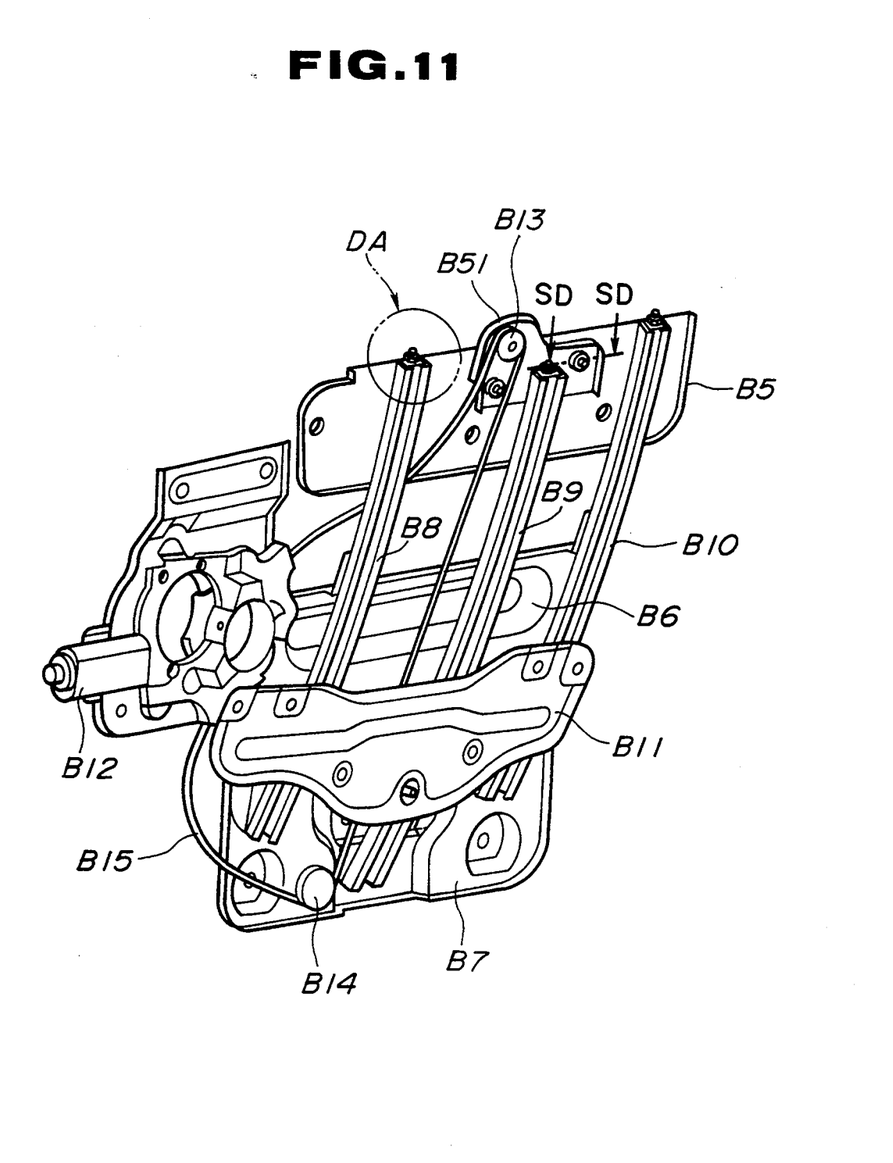
FIG. 11 is a perspective view of the regulator with a carrier plate assuming a lower position.
Figure 13:
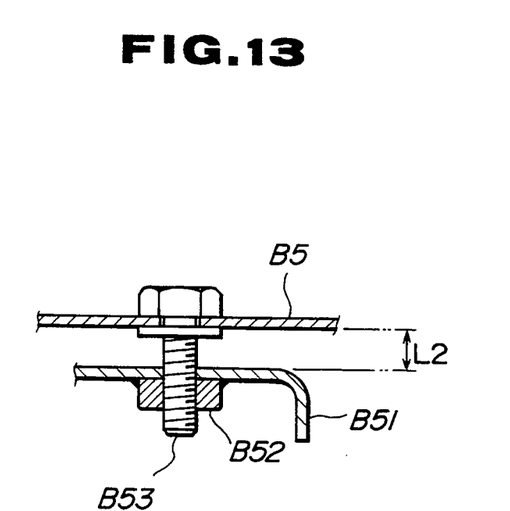
FIG. 13 is an enlarged sectional view taken along the line "SD—SD" of FIG. 11.

As is seen from FIGS. 11 and 13, between the upper bracket B5 and the upper end of the center guide rail B9, there is disposed a distance adjusting plate B51. The upper end of the center guide rail B9 is secured to the distance adjusting plate B51, and a base portion of the plate B51 is secured to the upper bracket B5. As is understood from FIG. 13, the distance "L2" between the distance adjusting plate B51 and the upper bracket B5 is varied by turning a distance adjusting bolt B53 which extends therethrough. That is, the bolt B53 has a head rotatably held by the upper bracket B5 and a threaded portion engaged with a nut B52 welded to the plate B51. Thus, when the bolt B53 is turned by a certain degree, the inclination angle of the center guide rail B9 and thus that Of the carrier plate B11 is varied. It is to be noted that the upper pulley B13 of the window pane drive mechanism is connected to the distance adjusting plate B51.

Figure 12:
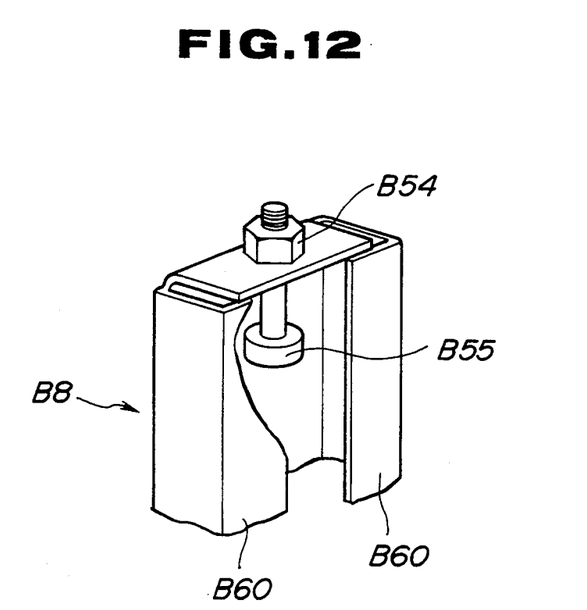
FIG. 12 is an enlarged perspective view of the portion indicated by the arrow "DA" of FIG. 11.

As is shown in FIG. 12, each guide rail B8, B9 or B10 has at the upper end a stopper construction for limiting the uppermost position of the carrier plate B11. The stopper construction comprises a nut B54 welded to an upper flange of the rail B8, B9 or B10, and a bolt B55 engaged with the nut B54 having its head portion received in the rail. That is, when the carrier plate B11 comes up to the uppermost position, the corresponding guide roller unit B48, B49 or B50 abuts against the bolt head.

As is seen from FIG. 1, the inner module "C" comprises generally a trim member C1, a pocket defining member C2, and an opening/closing control portion C3. A speaker C4 is mounted to the trim member C1. The trim member C1 has at its upper portion locating pins C6. These locating pins C6 are directed in the same direction, that is, toward the window pane lifter module "B".

As is seen from FIG. 5, an arm rest C7 is secured to the trim member C1. The arm rest C7 is formed with a rectangular recess C9 whose bottom has a bolt opening C8. Although not shown in the drawing, a pull handle is to be mounted in the recess C9. The arm rest C7 has a grip portion C10 whose leading end is formed with a bolt opening C11.

In the following, steps for assembling the outer module "A", the window pane lifter module "B" and the inner module "C" will be described with reference to the drawings, particularly, FIGS. 5 and 6.

First, the window pane lifter module "B" is connected to the outer module "A". For this connection, the lifter module "B" and the outer module "A" are positioned with respect to each other having the bolt openings B23 to B26 mated with the bolt openings A15 to A18, and thereafter, bolt-and-nut means B28 are associated with the mated bolt openings for achieving tight connection between the lifter module "B" and the outer module "A".

Since the bolt openings A15, A16, A17 and A18 of the outer module "A" are all directed toward the lifter module "B", the bolt fastening work is achieved with ease. Since the inner reinforce member B4 has the hollow construction and the connection between the inner reinforce member B4 and the inner panel A2 is made by means of a plurality of bolt-and-nut means B28, the intermediate unit including the two modules "B" and "A" can have a robust construction. Furthermore, since the bolt-nut-means B28 are widely applied to the unit ("B"+"A"), the relative positioning between the two modules is assured.

It is to be noted that the diameter of each of the bolt openings A15 to A18 and B23 to B26 is somewhat larger than that of bolt of the bolt-and-nut means B28. Thus, adjustment of the relative positioning between the two modules "B" and "A" is available.

The inner module "C" is then connected to the intermediate unit ("B"+"A") which has been assembled in the above-mentioned manner. That is, the inner module "C" and the intermediate unit ("B"+"A") are put together having the locating pins C6 led into the locating openings B20. With this, the relative positioning between the inner module "C" and the intermediate unit ("B"+"A") is effected resulting in that the bolt opening C8 of the arm rest C7 is mated with the bolt opening B16 of the L-shaped bracket B17 and the bolt opening C11 of the arm rest C7 is mated with the bolt opening B18 of the bracket B19. Then, bolts B29 and B30 are engaged with the respective mated openings (C8 and B16) and (C11 and B18) fastened to achieve a tight connection between the inner module "C" and the intermediate unit ("B"+"A"). Then, peripheral given portions of the inner module "C" are fixed to given portions of the inner panel A2 and the inner reinforce member B4 by means of known clips (not shown). With these steps, the automotive door of the present invention is assembled. Due to the above-mentioned construction, a window pane clearance defined between an upper edge of the outer panel A1 and the inner reinforce member B4 can be reduced, and thus, the rigidity of the door is much increased. That is, because of the rigid and robust construction of the window pane lifter module "B", the window pane B1 can travel an accurate path without play, which permits the reduction in thickness of the window pane clearance.

Figure 15:
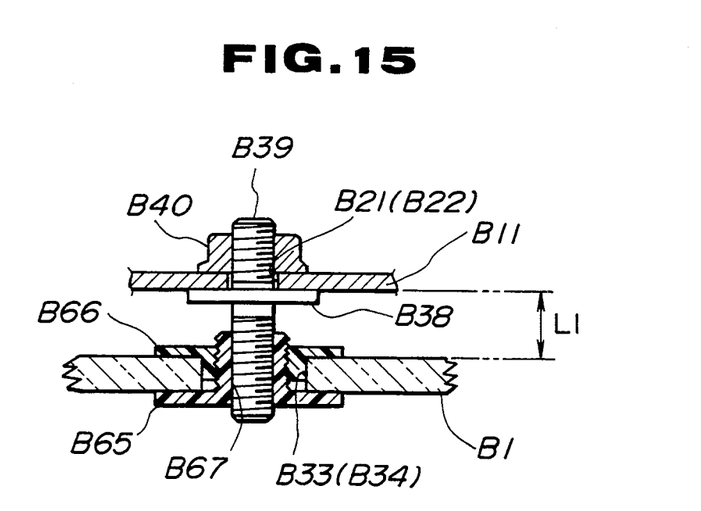
FIG. 15 is a sectional view similar to FIG. 10, but showing a first modification of the regulator.
Figure 16:
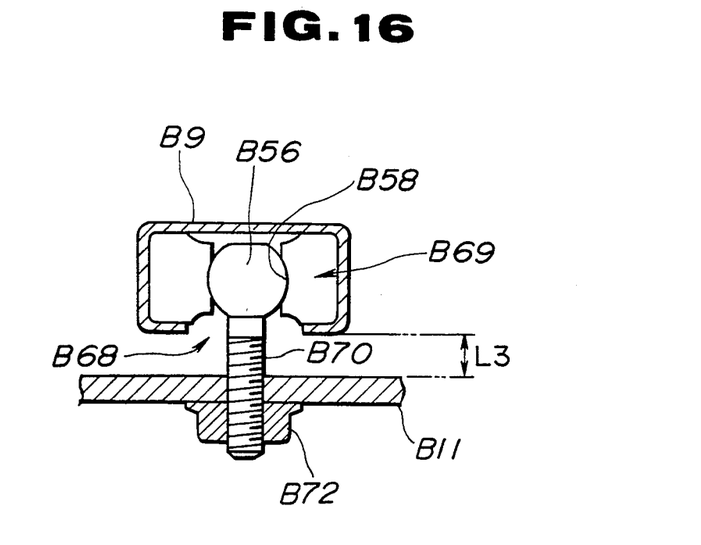
FIG. 16 is a sectional view similar to FIG. 9, but showing the first modification of the regulator.

Referring to FIGS. 15 and 16, there is shown a first modification of the regulator B3 which can be used as a part of the window pane lifter module "B".

In this modification, as is seen from FIG. 10, male and female bushes B65 and B66 are coupled in each of the upper and lower bolt openings B33 and B34 of the window pane B1. The male bush B65 is formed with a threaded bore B67 with which the base portion of the adjusting bolt B39 is engaged. Thus, when the adjusting bolt B39 is turned, the distance "L1" between the carrier plate B11 and the window pane B1 is varied.

The center guide roller unit B68 used in this first modification is shown in FIG. 16. As shown, the unit B68 is associated with the center guide rail B9. In this unit B68, there is no means which corresponds to the abovementioned slider B62 (see FIG. 9). As shown, the metal shaft B56 has a threaded base portion B70 which is engaged with a nut B72 secured to the carrier plate B11. Thus, by turning the metal shaft B56, the distance "L3" between the center guide rail B9 and the carrier plate B11 is adjustable. If desired, the front and rear guide roller units may have the same construction as the above-mentioned center guide roller unit B68.

Figure 17:
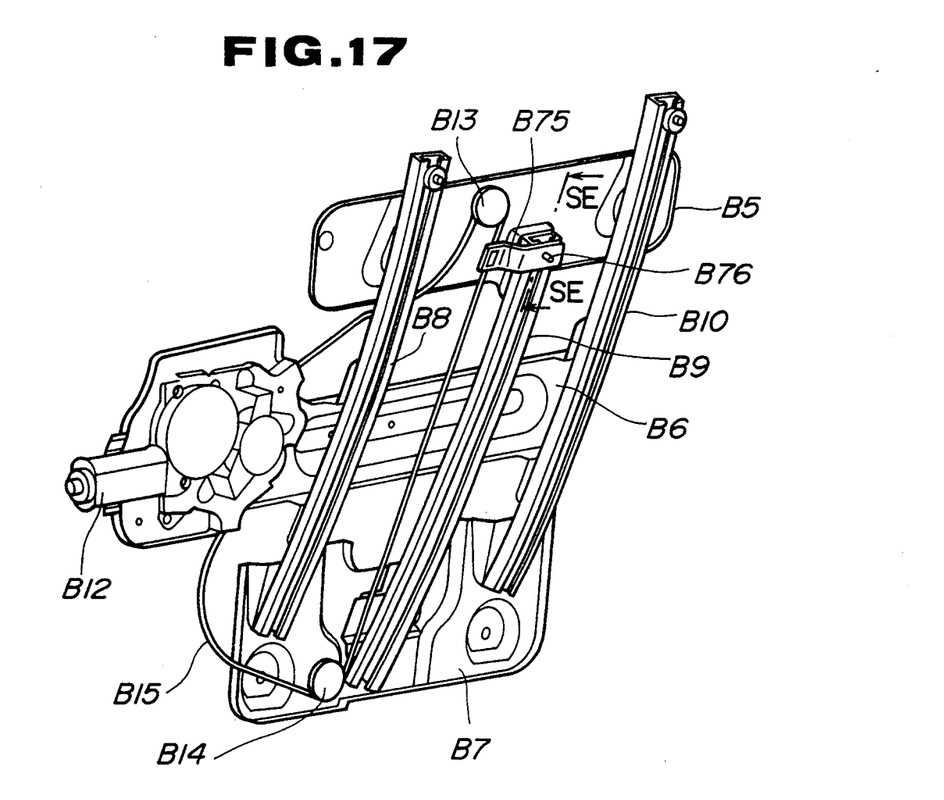
FIG. 17 is a perspective view of a second modification of the regulator.
Figure 18:
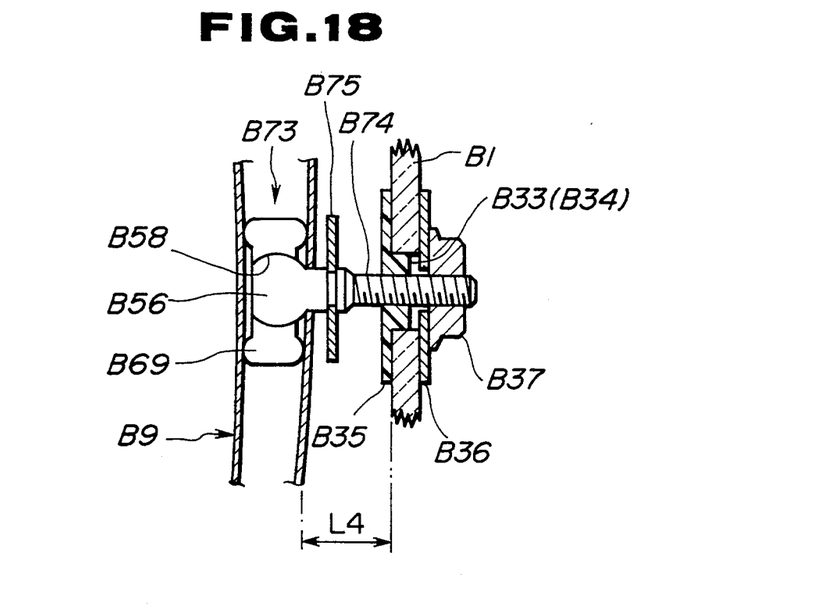
FIG. 18 is an enlarged sectional view taken along the line "SE—SE" of FIG. 17.

Referring to FIGS. 17 and 18, there is shown a second modification of the regulator B3 which can be used also as a part of the window pane lifter module "B".

In this modification, the so-called "carrier plate" is not used. That is, the window pane B1 is "directly" connected to the front, center and rear guide rails B8, B9 and B10 through respective guide roller units.

The center guide roller unit B73 used in this second modification is shown in FIG. 18. As shown, the unit B73 is associated with the center guide rail B9. The metal shaft B56 has a spherical head portion rotatably received in a spherical recess B58 of a slider B69. The slider B69 is slidably engaged with the guide rail B9.

The metal shaft B56 has further a threaded base portion B74 which is engaged with both the ring nut B35 and the lock nut B37 which are mated with the bolt opening B33 or B34 formed in the window pane B1. Designated by numeral B36 is the washer tightly put between the window pane B1 and the lock nut B37. The metal shaft B56 is equipped with a guide plate B75 to which a portion of the drive wire B15 (see FIG. 17) is fixed. By turning the metal shaft B56, the distance "L4" between the center guide rail B9 and the window pane B1 is adjustable. The front and rear guide roller units have substantially the same construction as the above-mentioned center roller unit B73. When, due to energization of the power device B12, the drive wire B15 is moved and thus the window pane B1 is moved upward or downward along the guide rails B8, B9 and B10.

In the following, advantageous features of the present invention will be described.

First, the door inner waist reinforce member B4, the regulator B3 and the door window pane B1 are integrally assembled to constitute a window pane lifter module "B". Thus, inspection and adjustment of the door lifting mechanism can be made with ease prior to completion of assembly of the door. That is, the window pane lifter mechanism "B" thus inspected and adjusted is secured by bolts to the inner panel A2 of the outer module "A" to constitute the intermediate unit ("B"+"A") and then the inner module is connected by bolts to the intermediate unit ("B"+"A"). As is described hereinabove, the procedure of this assembly is simple.

Second, the window pane B1 is connected to the carrier plate B11 or the guide rails B8, B9 and B10 (viz., the second modification of FIGS. 17 and 18) by means of a so-called "window pane inclination adjuster" which comprises the upper adjusting bolts B39 or B56 and the lower adjusting bolts B39 or B56. Thus, the inclination angle of the window pane B1 relative to the door proper is easily adjustable by turning the upper and lower adjusting bolts B39 or B56. Of course, when the upper and lower adjusting bolts are turned by the same degree, parallel displacement of the window pane B1 is made in the door proper.

Third, the upper end of the center guide rail B9 is connected to the upper bracket B5 (see FIGS. 11 and 13) through the distance adjusting plate B51. Thus, the inclination angle of the window pane B1 relative to the door proper can be varied by only manipulating the bolt B53 of the distance adjusting plate B51. That is, adjustment of the inclination angle of the window pane B1 is achieved by manipulating not only the above-mentioned "window pane inclination adjuster" but also the distance adjusting plate B51.

Fourth, each of the guide roller units B48, B49 and B50 has a so-called "ball-joint" therein. Thus, the inclination adjustment of the window pane B1 is carried out without affecting the upward and downward movement of the window pane along the guide rails B8, B9 and B10.

Fifth, when the sliders B62 are employed in the guide roller unit B48, B49 or B50 (see FIGS. 8 and 9), undesired lateral play of the carrier plate B11 is suppressed or at least minimized. Furthermore, when the sliders B62 have the front and rear stoppers B64, undesired fore-and-aft play of the window pane B1 is suppressed.

What is claimed is:

1. An automotive sashless door having a window pane, comprising:

an outer module including an outer panel and an inner panel which are connected to each other;
   an inner module; and
   a window pane lifter module interposed between said outer and inner modules, said window pane lifter module including a plurality of horizontal bracket members, a plurality of vertically extending guide rails secured to said horizontal bracket members to constitute a grid structure, a horizontal reinforcing member secured to said horizontal bracket members to reinforce said grid structure, a carrier plate slidably guided by said guide rails and carrying said window pane, a regulator secured to said reinforcing member to drive said carrier plate and angle adjusting means for adjusting an angle defined between said window pane and said carrier plate,
   wherein said bracket members, said guide rails, said reinforcing member, said carrier plate, said window pane, said regulator and said angle adjusting means have been assembled to constitute a single unit before said window panel lifter module is connected to said outer and inner modules.

2. An automotive door as claimed in claim 1, in which a corner piece is integrally connected to said unit.

3. An automotive door as claimed in claim 1, in which said inner module comprises generally a trim member, a pocket defining member and an opening/closing control device.

4. An automotive door as claimed in claim 1, in which said carrier plate and said angle adjusting means comprise:

first and second groups of adjusting bolts, each bolt having a slider structure slidably engaged with one of said guide rails and a threaded base portion engaged with a net secured to said window pane,
   wherein said first group of adjusting bolts are positioned above said second group of adjusting bolts with respect to the door assembled.

5. An automotive door as claimed in claim 4, in which said slider structure comprises:

a spherical head portion of said adjusting bolt; and
   a slider slidably engaged with said guide rail, said slider having a spherical recess in which said spherical head portion is rotatably received.

6. An automotive door as claimed in claim 5, in which said threaded base portion of said adjusting bolt is passed through an opening formed in said window pane, said nut being mated with said opening.

7. An automotive door as claimed in claim 6, in which said adjusting bolt has a drive wire connected thereto.

8. An automotive door as claimed in claim 1, in which said carrier plate comprises:

means for mounting thereon said window pane through said angle adjusting means; and
   a plurality of guide roller units interposed between said guide rails and said mounting means.

9. An automotive door as claimed in claim 8, in which each of said guide roller units comprises:

a metal shaft connected to said carrier plate to move therewith, said metal shaft having a spherical head portion formed thereon; and
   a roller having a spherical recess in which said spherical head portion is rotatably received, said roller being slidably engaged with one of said guide rails.

10. An automotive door as claimed in claim 9, in which said metal shaft has a threaded base portion which is meshed with a nut secured to said carrier plate.

11. An automotive door as claimed in claim 9, in which the guide roller unit further comprises:
- a slider slidably engaged with said guide rail and having said roller rotatably connected thereto; and
- an elastic member interposed between said slider and said carrier plate.

12. An automotive door as claimed in claim 11, in which said slider is formed with a pair of grooves in which two lip portions defined by said guide rail are slidably received.

13. An automotive door as claimed in claim 12, in which said slider is formed with an extension portion which extends near and along one side wall of said guide rail.

14. An automotive door as claimed in claim 8, in which said inclination angle adjusting means comprises:
- first and second groups of adjusting bolts, each bolt having a first end portion engaged with a first nut secured to said carrier plate and a second end portion engaged with a second nut secured to said window pane,
- wherein said first group of adjusting bolts are positioned above said second group of adjusting bolts with respect to the door assembled.

15. An automotive door as claimed in claim 14, in which said adjusting bolt is passed through both a first bolt opening formed in said carrier plate and a second bolt opening formed in said window pane, said first and second nuts being mated with said first and second openings respectively.

16. An automotive door as claimed in claim 15, in which said second nut comprises male and female bushes which are coupled in said second bolt opening, said male bush being formed with a threaded bore with which said second end portion of said adjusting bolt.

17. An automotive door as claimed in claim 1, in which said window pane regulator further comprises another angle adjusting means which varies the inclination angle of one of said guide rails relative to said horizontal bracket members.

18. An automotive door as claimed in claim 17, in which said another angle adjusting means comprises a distance adjusting bolt which has a head portion rotatably held by said horizontal bracket members and a threaded leading end engaged with a net secured to an upper end of said guide rail.

19. An automotive door as claimed in claim 1, in which each of said guide rails is provided with a stopper structure by which the uppermost position of said window pane is limited.

20. An automotive door as claimed in claim 19, in which said stopper means comprises:
- a nut secured to an upper flange of said guide rail; and
- a bolt engaged with said nut having a head portion directed downward.

21. An automotive sashless door having a window pane, comprising:
- an outer module including an outer panel and an inner panel which are connected to each other;
- an inner module; and
- a window pane lifter module interposed between said outer and inner modules, said window pane lifter module including a door inner waist reinforce member which is fixed to said inner panel of said outer module and a window pane regulator which is connected to said door inner waist reinforce member and regulates said window pane,
- wherein (i) said door inner waist reinforce member, said window pane regulator and said window pane are integrally assembled to constitute a unit, and (ii) said window pane regulator includes
- a plurality of guide rails,
- a supporting structure for supporting said guide rails, said supporting structure being secured to said inner waist reinforce member,
- carrying means for permitting said window pane to slide along said guide rails, and
- inclination angle adjusting means for adjusting an inclination angle of said window pane relative to said guide rails.

* * * * *